Patented July 3, 1951

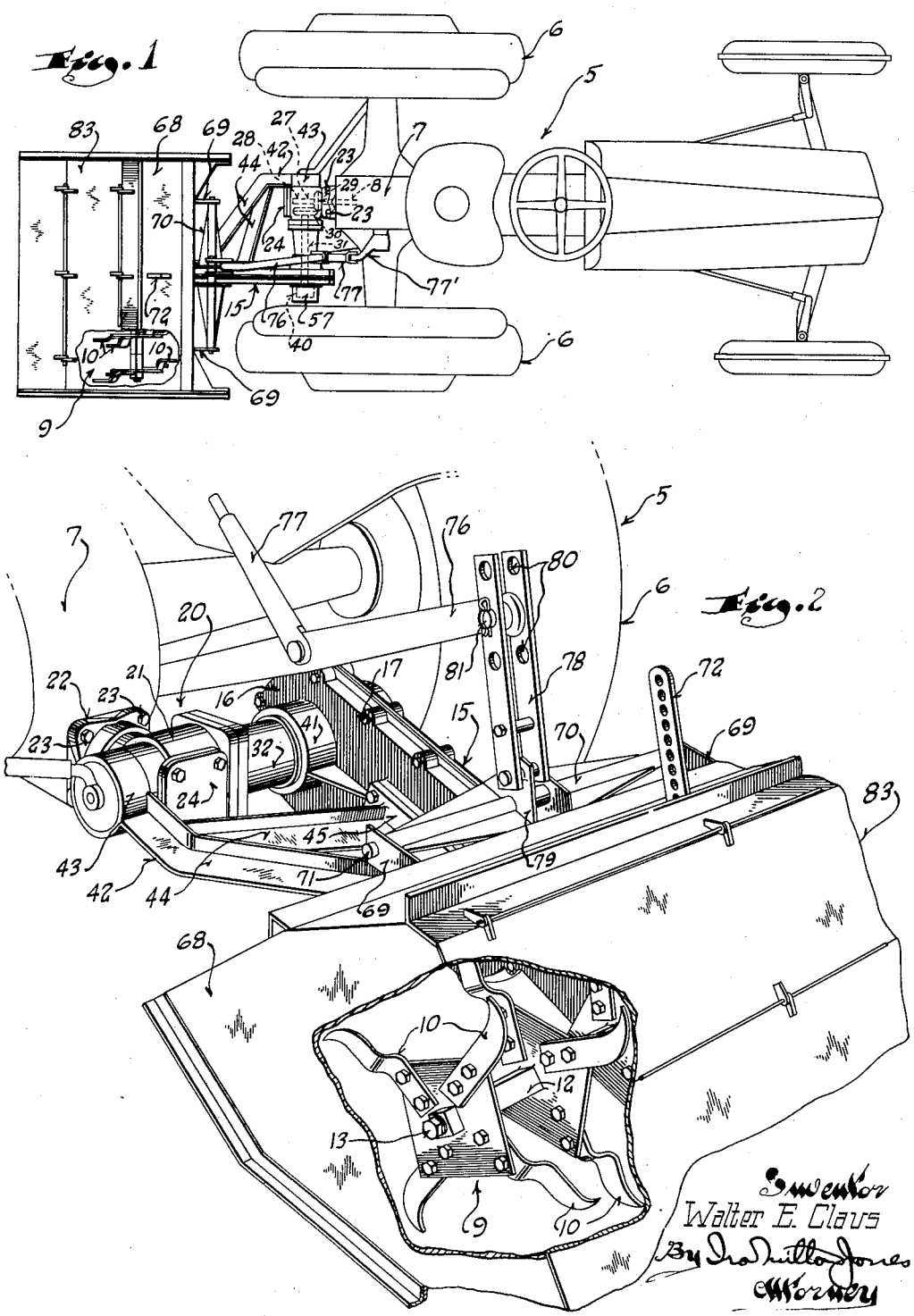

2,558,822

UNITED STATES PATENT OFFICE 2,558,822

DEPTH CONTROL HOOD MECHANISM FOR SOIL-WORKING ROTORS

Walter E. Claus, Milwaukee, Wis.

Application August 9, 1945, Serial No. 609,818

3 Claims. (Cl. 97—40)

This invention relates to ground working implements and is a continuation in part of the copending application of Walter E. Claus, Serial No. 565,607, filed November 29, 1944, now Patent No. 2,491,892, issued December 20, 1949.

As in said copending application, the implement of this invention is of the type having a rotary ground working unit or tiller in which a plurality of ground working tines is mounted on a power driven rotor shaft to revolve at high speed and till the soil by literally "chewing" it up.

While the implement forming the subject matter of the aforesaid copending application is designed primarily for use in gardens and on small truck farms, the implement of this invention is intended for use on larger farms and to this end is adapted for attachment to a full size farm tractor. The particular type or make of tractor with which the implement may be used is, of course, subject to choice, but the Ford-Ferguson tractor has been found to be exceptionally well adapted for use with this implement.

In this type of tractor, a rearwardly extended power take-off shaft is readily accessible merely by the removal of a cap screwed to the rear lower portion of the differential housing. Also this type of tractor is equipped with hydraulically operated means for elevating the ground working elements of implements towed by the tractor, a feature utilized in this invention to raise the entire implement off the ground.

Ground working implements towed by tractors, heretofore, were generally wholly independent of the tractor except for the towing connection to the drawbar. In other words, they rode on the ground at all times, generally on wheels. The present invention differs from this past practice and has as one of its objects to provide a novel manner of attaching the implement to the tractor whereby the implement actually becomes part of the tractor.

As in the implement forming the subject matter of the aforesaid copending application, the rotor revolves in the direction which brings its tines downwardly into the fresh earth as the implement moves forwardly. This, plus the fact that the entire implement is pivoted from the back of the tractor enables the rotor to automatically climb over obstructions which cannot be deflected sideways, as, for instance, ordinary field stones. While the rotor is desirably free to climb over obstructions, the depth to which it digs must, of course, be limited. Hence it is another object of this invention to utilize the hood, with which implements of this type are generally equipped, and which covers the rotor, to limit the depth to which the rotor will dig by having the hood ride upon the ground and connecting the hood with the rotor by means of a lost motion connection which allows limited up and down movement of the rotor within the hood.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate a complete example of the physical embodiment of the invention constructed according to the best mode so far devised for the practical application of the principles thereof, and in which:

Figure 1 is a top plan view of an implement embodying this invention illustrating the same attached to a tractor of the Ford-Ferguson type;

Figure 2 is a perspective view of the implement with a part of its hood broken away to show the rotor;

Figure 3:
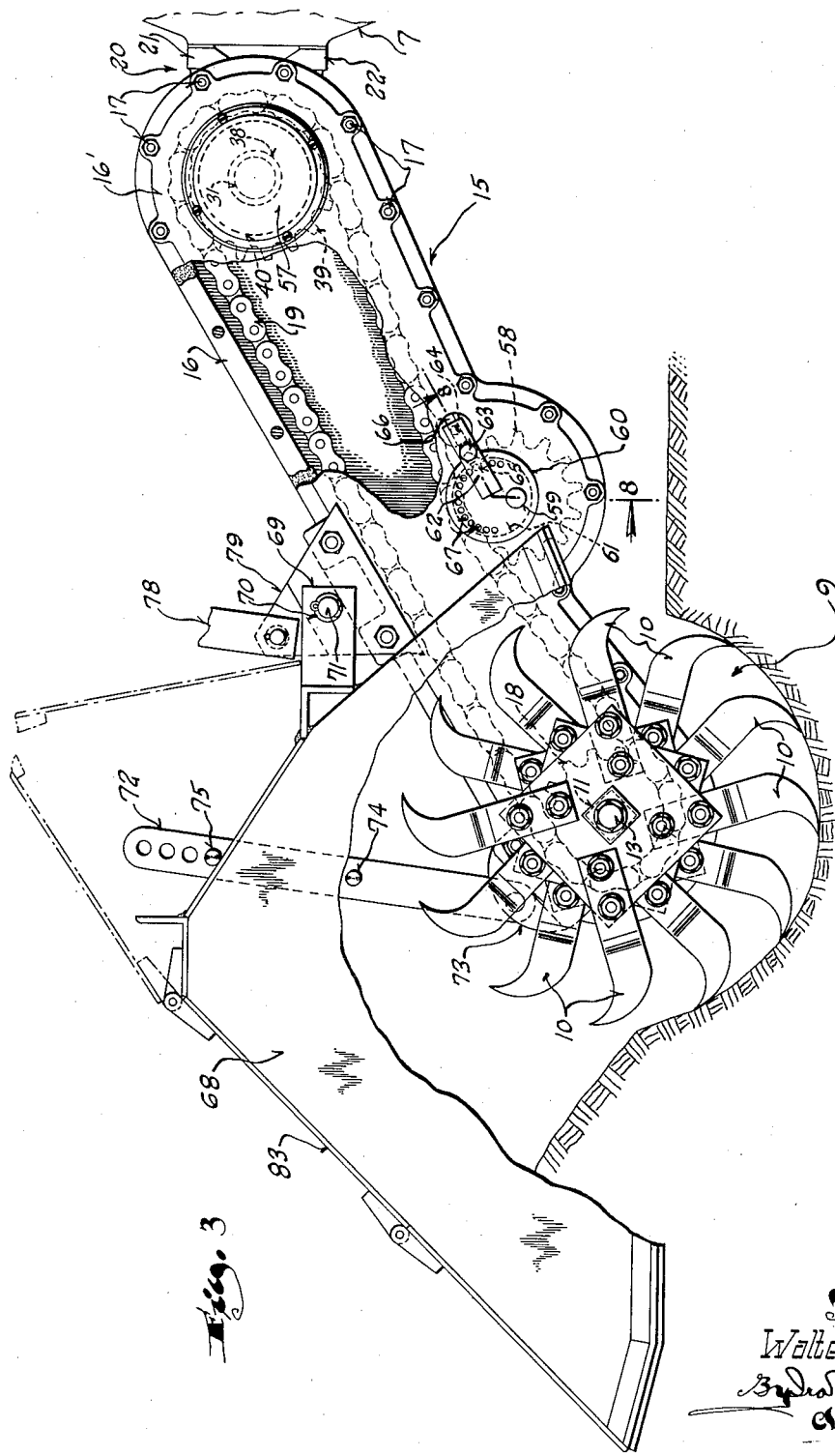
Figure 3 is a side view of the implement with parts broken away and illustrating the manner in which the rotor operates in the soil.

Referring now more particularly to the accompanying drawings in which like numerals indicate like parts through several views, the numeral 5 designates generally a tractor having transversely spaced traction wheels 6 and a differential housing 7. The differential housing has a power take-off shaft 8 projecting from the rear thereof. This power take-off shaft extends rearwardly along the bottom of the differential housing and provides the means whereby the power from the tractor may be utilized to drive the rotor 9 of the ground working implement. The rotor 9 is covered by a hood 68 forming the subject matter of the present invention.

The rotor 9 consists of a plurality of sets of tines 10 removably mounted on a square drive shaft 11. Essentially the sets of tines 10 are like those of the aforesaid copending application and inasmuch as the specific construction of the tine sets and the manner in which they are mounted on the shaft 11, constitutes one of the features of the aforesaid application, it need not be described in detail here. It is sufficient to point out that each set of tines is mounted on a short tube 12 complementary in cross section to the shaft 11, and that the tubes 12 are removably held in place on the shaft by end caps 13 removably mounted on the ends of the shaft.

Also as in the aforesaid copending application, the rotor shaft 11 is journaled in a bearing structure mounted in one end of a narrow transmission chain housing 15. This housing is composed of two complementary sections 16 and 16' secured together by bolts 17. Within it and secured to the shaft 11 is a sprocket wheel 18 with a chain 19 trained thereover.

The hollow chain housing 15 constitutes a boom by which the implement is pivotally mounted on a supporting unit indicated generally by the numeral 20, and which in turn is secured to the rear of the tractor over the end of the power take-off shaft. The supporting unit 20 consists of a gear housing 21 having a front flanged face 22 shaped to fit the portion of the differential housing surrounding the projecting power take-off shaft 8, where it is held by studs 23.

The front wall 22 and the opposite rear wall 24 of the housing 21, which is preferably a removable cover plate, are respectively provided with suitable axially aligned bearings, not shown. Journaled in these bearings is a bevel gear shaft 27 made up of two sections, namely, a solid stub shaft 28 and a bevel gear 29, the hub of which is splined and fits over the projecting end of the power take-off shaft which, of course, is also splined. The hub of the bevel gear 29 receives the adjacent end of the solid stub shaft 28 to which it is welded or otherwise fixed.

The bevel gear 29 meshes with another gear 30 fixed to one end of a jack shaft 31. This jack shaft is quite long and project laterally out through the side of the housing 21 and into a tubular extension 32 fixed to the side of the housing 21. The tubular extension 32, of course, may be integral with the housing 21, but is preferably a separate casting bolted to the side of the housing. The opposite ends of this tubular extension have bearings, not shown, in which the jack shaft is journaled. The end of the shaft remote from the gear 30 projects beyond the adjacent outer end of the tubular extension 32.

Where the jack shaft projects from the tubular extension, the jack shaft is reduced in diameter to provide a shoulder. A bushing 38 is fitted over the reduced end of the shaft to bear against this shoulder.

Freely rotatable on the bushing is a sprocket wheel 39, which is inside the transmission chain housing 15 in line with the other sprocket wheel 18 and likewise has the chain 19 trained thereover. Hence, the rotor may be driven from the sprocket wheel 39, which is drivingly connected with the jack shaft 31 through a spring loaded slip clutch indicated generally by the number 40.

A hub 41 on the section 16 of the transmission chain housing is journaled on the outer end of the tubular extension 32 which is formed as a shouldered bearing to receive the hub 41. In assembling these parts, the housing section 16, prior to the attachment of its complementary section 16' is slipped onto the end of the tubular extension against the shoulder which limits onward movement. The parts are held in this assembled relationship permitting free pivotable movement of the chain housing, boom-fashion, about the axis of the jack shaft 31, by a bracket 42. The bracket 42 has a hub portion 43 mounted on the end of the gear housing opposite the tubular extension in a manner similar to the mounting of hub 41. Diagonal arms 44 extend from the hub portion 43 to the transmission chain housing where they are secured by means of cap screws passed through a flange 45 joining the arms 44 and threaded into a pad on the side of the chain housing 16.

It will be noted that the chain housing 15 cooperates with the hollow extension 32 to completely enclose the drive transmission from the jack shaft 31 to the rotor shaft 11, and that the slip clutch 40 is conveniently assembled on the end portion of the jack shaft projecting from the sprocket wheel 39.

In operation it is, of course, understood that the clutch 40 normally does not slip, but drives the sprocket wheel 39 in unison with the jack shaft 31; only when the rotor encounters obstructions which impose an unusual load, will the clutch slip and through slipping the tractor, as well as the implement, it will be safeguarded against breakage.

The sprocket wheel 39 being substantially on the median plane of the chain housing 15, the clutch assembly 40 projects through a hole in the side wall of the chain housing section 16', and into a cap 57 secured over the hole. The cap 57 thus is part of the chain housing and completes the enclosure of the drive mechanism.

Slack in the transmission chain 19 is taken up by an adjustable idler sprocket 58. This sprocket is journaled on a stub shaft 59 eccentrically fixed to a flanged disc 60. The disc 60 is rotatably held in a bearing 61 in the side wall of the chain housing section 16' with its flanged end overlying the outer face of the bearing by an arm 62. The arm 62 is secured in position by a cap screw 63. A pair of dowel pins 64 and 65 carried by the arm respectively engage in a groove 66 in the wall of the housing section and any one of a plurality of notches 67 in the disc 60 to hold the disc in an adjusted position. During rotation of the disc to effect adjustment of the chain tension, the screw 63 is backed out sufficiently to allow the dowel pin 65 to snap from one hole 67 to the other.

The hood 68 of this invention covers the rotor and normally confines the soil churned up by the rotor. This hood is pivotally connected to the boom-like chain housing 15 by means of a pair of arms 69 welded to the front top portion of the hood and laterally spaced apart to receive therebetween a bracket structure 70 bolted to the chain housing 15. A rod 71 passing through the bracket structure 70 and the arms 69 hingedly connects the hood to the chain housing.

The extent of relative motion permitted between hood and rotor is limited by a link 72 pivoted to the free end of the chain housing as at 73 and extending through a hole in the top of the hood. A pin 74 fixed in the link 72 inside the hood limits downward movement of the hood with respect to the rotor so that in lifting the chain housing in the manner to be described, the hood is held from dropping down on the rotor. Another pin 75, removably secured in any one of the plurality of holes in the upper end of the link 72, limits downward movement of the rotor with respect to the hood. Thus, with the hood riding upon the ground, the engagement with pin 75 with the top of the hood limits the depth to which the rotor digs, without however, precluding the desired limited up and down movement of the rotor within the hood.

By virtue of the pivotable mounting of the chain housing 15, the entire implement is rigidly supported from the back of the tractor in a manner permitting the implement to be raised and lowered, boom-fashion. During use, the implement is free to ride up and down on the ground as the contour thereof dictates with the rotor digging to a depth determined by the setting of the pin 75. The entire implement may be elevated by the hydraulically operated elevating mechanism with which the tractor is equipped. This mechanism, in tractors of the Ford-Ferguson type, includes a pivoted arm 76 to which a link 77 is connected, the link being attached to a lever 77' which in turn is actuated by the hydraulic lifting mechanism, not shown.

A link 78 connects the outer end of the arm 76 with the implement, preferably through the medium of a plate 79 which may constitute part of the bracket structure 79. The effective length of the link 78 may be varied by virtue of the series of holes 80 through which any one set of a pin 81 passes to connect the link to the arm 76.

It is, of course, also possible to determine the depth to which the rotor will dig by controlling the position of the arm 76 by means of the hydraulic lifting mechanism, but it is preferable to allow the hood to perform this function in the manner described.

For the elimination of quack grass and other obnoxious weeds, it is desirable to spray the soil and vegetation up into the air and to enable this procedure, the hood has a sectional hinged cover 83. The panels of this hinged cover may be raised so that the soil and vegetation churned up by the rotor may be sprayed up into the air. In this manner, the quack grass roots will be laid out on top of the soil where the sun can get at them to dry them out.

From the foregoing description, taken in connection with the accompanying drawings, it will be readily apparent to those skilled in the art to which this invention appertains, that the hood of this invention limits the depth to which the rotor may dig, and at the same time permits the rotor to move upwardly relative thereto whenever obstructions are met by the rotor.

What I claim as my invention is:

1. In a ground working implement of the character described: a rotor having ground working tines; a boom structure in one end of which the rotor is journalled; means on the boom structure remote from the rotor for attaching the same to a tractor in a manner allowing free up and down movement of the end of the boom structure in which the rotor is journalled; a hood positioned over the rotor; means connecting the hood with the boom structure in a manner allowing limited relative up and down movement between the hood and the rotor; and a lost motion connection between the hood and the rotor for limiting downward movement of the rotor with respect to the hood whereby the hood riding on the ground and acting through said lost motion connection may determine the depth to which the rotor digs.

2. In an agricultural implement having a supporting structure adapted to be propelled across the ground: a power driven soil working rotor carried by the supporting structure for rotation on a substantially horizontal axis and for bodily up and down motion, said rotor having tines to loosen and break up the soil and tending to lower itself bodily into the ground as it rotates; and means for limiting the depth to which the rotor may lower itself into the ground during operation of the implement comprising a hood covering the rotor, a connection between the hood and the supporting structure forwardly of the rotor axis, said connection accommodating relative up and down movement between the hood and the rotor and enabling the hood to ride on the ground during operation of the implement notwithstanding bodily up and down movement of the rotor, and a connection between the hood and the rotor limiting downward movement of the rotor with respect to the hood.

3. The structure set forth in claim 2 further characterized by the provision of means for limiting upward movement of the rotor with respect to the hood to preclude the rotor striking the hood upon its being lifted fully off the ground.

WALTER E. CLAUS.

REFERENCES CITED

The following references are of record in the file of this patent:

UNITED STATES PATENTS

| Number | Name | Date |
| --- | --- | --- |
| 1,425,305 | White | Aug. 8, 1922 |
| 1,600,215 | Clarkson | Sept. 21, 1926 |
| 1,614,356 | Foot | Jan. 11, 1927 |
| 1,676,646 | Funk | July 10, 1928 |
| 1,830,565 | Schaeffers | Nov. 3, 1931 |
| 2,012,434 | Pedersen | Aug. 27, 1935 |
| 2,214,702 | Seaman | Sept. 10, 1940 |
| 2,306,902 | Rabe | Dec. 29, 1942 |
| 2,333,980 | Branson | Nov. 9, 1943 |
| 2,366,386 | Clark | Jan. 2, 1945 |
| 2,370,777 | Clark | Mar. 6, 1945 |
| 2,428,973 | Kelsey | Oct. 14, 1947 |
| 2,442,731 | Paul | June 1, 1948 |
| 2,450,749 | Clark | Oct. 5, 1948 |
| 2,466,594 | Kelsey | Apr. 15, 1949 |

FOREIGN PATENTS

| Number | Country | Date |
| --- | --- | --- |
| 106,289 | Australia | Jan. 12, 1939 |
| 343,941 | Great Britain | Aug. 21, 1929 |
| | (Complete not accepted) | |